(12) United States Patent
Chiang

(10) Patent No.: US 6,757,750 B2
(45) Date of Patent: Jun. 29, 2004

(54) METHOD OF DYNAMICALLY SELECTING A PHYSICAL LAYER

(75) Inventor: Wen-Jie Chiang, Taipei (TW)

(73) Assignee: Via Technologies, Inc., Taipei (TW)

(*) Notice: Subject to any disclaimer, the term of this patent is extended or adjusted under 35 U.S.C. 154(b) by 251 days.

(21) Appl. No.: 09/956,243

(22) Filed: Sep. 20, 2001

(65) Prior Publication Data
US 2002/0083231 A1 Jun. 27, 2002

(30) Foreign Application Priority Data
Sep. 21, 2000 (TW) .................................. 89119535 A

(51) Int. Cl.[7] .............................................. G06F 13/14
(52) U.S. Cl. .............................. 710/16; 710/8; 710/15; 710/18; 710/19; 710/47; 710/64
(58) Field of Search ................................. 710/8, 10, 15, 710/16, 19, 46, 62, 18, 47, 64; 709/222, 227.23, 250; 370/44 P, 463, 469

(56) References Cited

U.S. PATENT DOCUMENTS

| | | | | |
|---|---|---|---|---|
| 5,289,458 A | * | 2/1994 | Taha | 370/228 |
| 5,410,535 A | * | 4/1995 | Yang et al. | 713/1 |
| 5,701,411 A | * | 12/1997 | Tran et al. | 709/250 |
| 5,922,052 A | * | 7/1999 | Heaton | 709/223 |
| 6,421,735 B1 | * | 7/2002 | Jung et al. | 709/250 |

* cited by examiner

Primary Examiner—Ilwoo Park
(74) Attorney, Agent, or Firm—Rabin & Berdo, P.C.

(57) ABSTRACT

A method for dynamically selecting a physical layer. When different physical layers are required to be selected to meet different transmission speeds, the method of the invention can dynamically select a physical layer without rebooting a computer. An interrupt service routine periodically checks for a different medium to be connected to a different physical layer. If it is detected, the physical layer is activated and the status of the medium is thus set.

10 Claims, 2 Drawing Sheets

METHOD OF DYNAMICALLY SELECTING A PHYSICAL LAYER

This application incorporates by reference Taiwanese application Serial No. 89119535, filed Sep. 21, 2000.

BACKGROUND OF THE INVENTION

1. Field of Invention

The present invention relates to a method of dynamically selecting a physical layer in a network system. More particularly, the present invention relates to a method of dynamically selecting a physical layer for a network card having a plurality of physical layers by means of software polling.

2. Description of Related Art

Computers have become one of the most important inventions to affect humanity. The computer has asserted itself into the daily lives of consumers. One computer can only handle personal affairs. However, when many are linked together, this allows the users to communicate with each other as well as share resources. This linking of many computers forms a computer network. This computer network has gradually changed how humanity lives, communicate, as well as work.

Furthermore, in recent years, the introduction of the computer network into homes has become a topic of interest. In fact, the design and implementation of network-able appliances is a topic of current research. The ability of networking household appliances, either to a computer network or the Internet, will allow users to control them at a distance over the network. Appliances capable of being controlled through the network are known as information appliances (IA). The appliances together with the computers form a local area network (LAN) or a home LAN. Currently, 4-wire twisted pair (telephone line) is used to connect the IA and the computer in the Home LAN, but the 8-wire twisted pair of the Ethernet can be also used. Therefore, it is very important that a network interface card has connectors for connecting to both the telephone line and the twisted pair of the Ethernet.

FIG. 1 shows layers of Open System Interconnection (OSI) model for a general computer network. Referring to FIG. 1, the OSI model comprises a physical layer (PHY), a medium access control (MAC) layer, a driver layer and an operating system layer. The physical layer is used for connecting to the transmission medium, for example, telephone lines or twisted pair. The MAC layer is used for controlling packet receptions and transmissions, wherein the packet is the transmission unit. The operating system layer controls the MAC layer by a driver.

FIG. 2 is a schematic diagram of a network interface card (NIC) used for a local area network. The NIC 201 comprises a 4-wire twisted pair connector 203 and an 8-wire twisted pair connector 205 for respectively connecting to a telephone line and a twisted pair of the Ethernet. The 4-wire twisted pair connector 203 and 8-wire twisted pair connector 205 respectively belong to different physical layers, and as such, a user can choose any one of them to connect to the network. Generally, the data transmission rate for the telephone line is 1 Mbps (bit per second) while that of the twisted pair of the Ethernet is 10/100/1000 Mbps.

Referring to FIG. 2, after the user plugs a medium into the connector 203 or 205, the computer is booted. The operating system initializes the computer after the booting procedure so that the driver can detect and set the peripheral devices. For example, a user plugs a telephone line into the connector 203. After the user boots the computer, the driver detects that the connector 203 is connected to the telephone line, and so the MAC layer is set to be connected to a first physical layer which corresponds to the telephone line. The MAC layer can then receive and transmit packets through the first physical layer and the telephone line. Meanwhile, a second physical layer and the MAC layer are in a disconnect status.

However, if the user wants to change to a different medium to connect to the network, the computer cannot successfully change the medium when the computer is running. When the user unplugs the telephone line from the connector 203, the first physical layer sends an interrupt to the MAC layer, and the MAC layer also sends an interrupt to the driver. The driver then sets the MAC layer and the first physical layer to be disconnected. If the user connects the twisted pair of the Ethernet to the connector 205, the driver and the MAC layer can not actively detect the second physical layer corresponding to the connector 205. Therefore, the MAC layer and the second physical layer are disconnected even if the Ethernet twisted pair is connected to the connector 205. Accordingly, since the MAC layer and the second physical layer are disconnected, data cannot be received nor transmitted. In this case, the user has to reboot the computer so that the driver can detect and set the connectivity between the MAC layer and the physical layer for normal network operation. As can be seen, this is not convenient for the user.

SUMMARY OF THE INVENTION

Therefore, it is an objective of the present invention to provide a method for dynamically selecting one of physical layers from a network interface card. When different physical layers are required to be selected to meet different transmission speed, the method of the invention can dynamically select a physical layer without the need to reboot the computer. Therefore, the use of the network system can become more convenient.

According to the objective, the present invention provides a method for dynamically selecting one of physical layers for a network interface card. The physical layers have at least a first physical layer and a second physical layer which are respectively connected to a first medium and a second medium. According to the disclosure of the invention, it first triggers an interrupt service routine when the first medium disconnects from the first physical layer. A timer is activated by the interrupt service routine. An interrupt is periodically sent by the timer to trigger the interrupt service routine until the interrupt service routine detects the second medium is connected to the second physical layer. The second physical layer therefore activates, and then the correct status for the second medium is set. The timer is then stopped to terminate the method.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The invention applies an interrupt service routine to automatically determine the code of the currently used physical layer for dynamically selecting a physical layer. The dynamical selection means that the system can automatically and correctly set the related settings when the physical layer is changed due to a change of the medium currently used, without manually setting or rebooting the computer.

Figure 1:
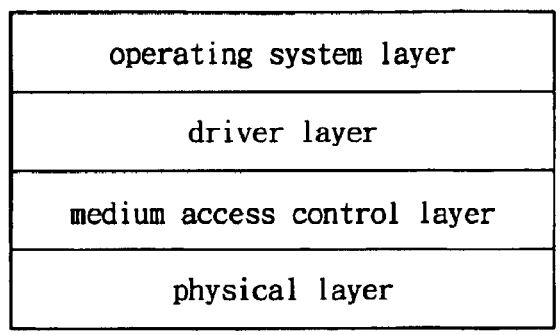
FIG. 1 shows layers of Open System Interconnection (OSI) model for a general computer network.
Figure 2:
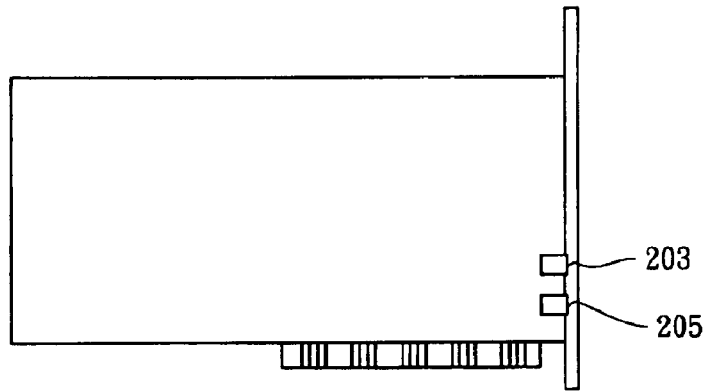
FIG. 2 is a schematic diagram of a network interface card (NIC) used for a local area network.
Figure 3:
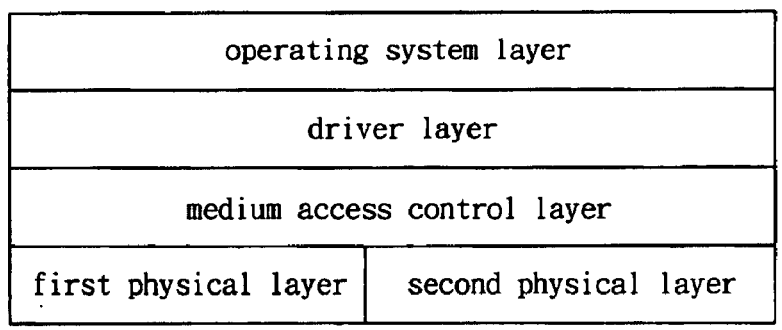
FIG. 3 shows a layered structure of a computer network having two physical layers.

FIG. 3 shows a layered structure of a computer network having, for example, two physical layers according to a preferred embodiment of the present invention. The layered structure comprises a physical layer (PHY), a medium access control (MAC) layer, a driver layer, and an operating system layer. In the preferred embodiment, the layered structure comprises two physical layers for simplicity. It should be noted that the number of the physical layers are not restricted to two. The physical layer is used to connect to a transmission medium. The transmission medium can be a telephone line or twisted pair of the Ethernet. The MAC layer is used to control the reception and transmission of the packets. The operating system layer controls the MAC layer by a driver.

Assuming a first medium is initially connected to a first connector, a user then unplugs the first medium from the first connector and connects a second medium to a second connector. The first and the second connectors respectively correspond to a first and second physical layers. When the user unplugs the first medium from the first connector, the first physical layer sends an interrupt to the MAC layer which then sends an interrupt to a driver. When the driver receives the interrupt from the MAC layer, a timer is activated. The timer periodically triggers an interrupt to the driver so that the driver can execute an interrupt service routine. The interrupt service routine then checks and, if linked, activates the linked layer thus achieving the purpose of dynamically selecting one of the physical layers.

Figure 4:
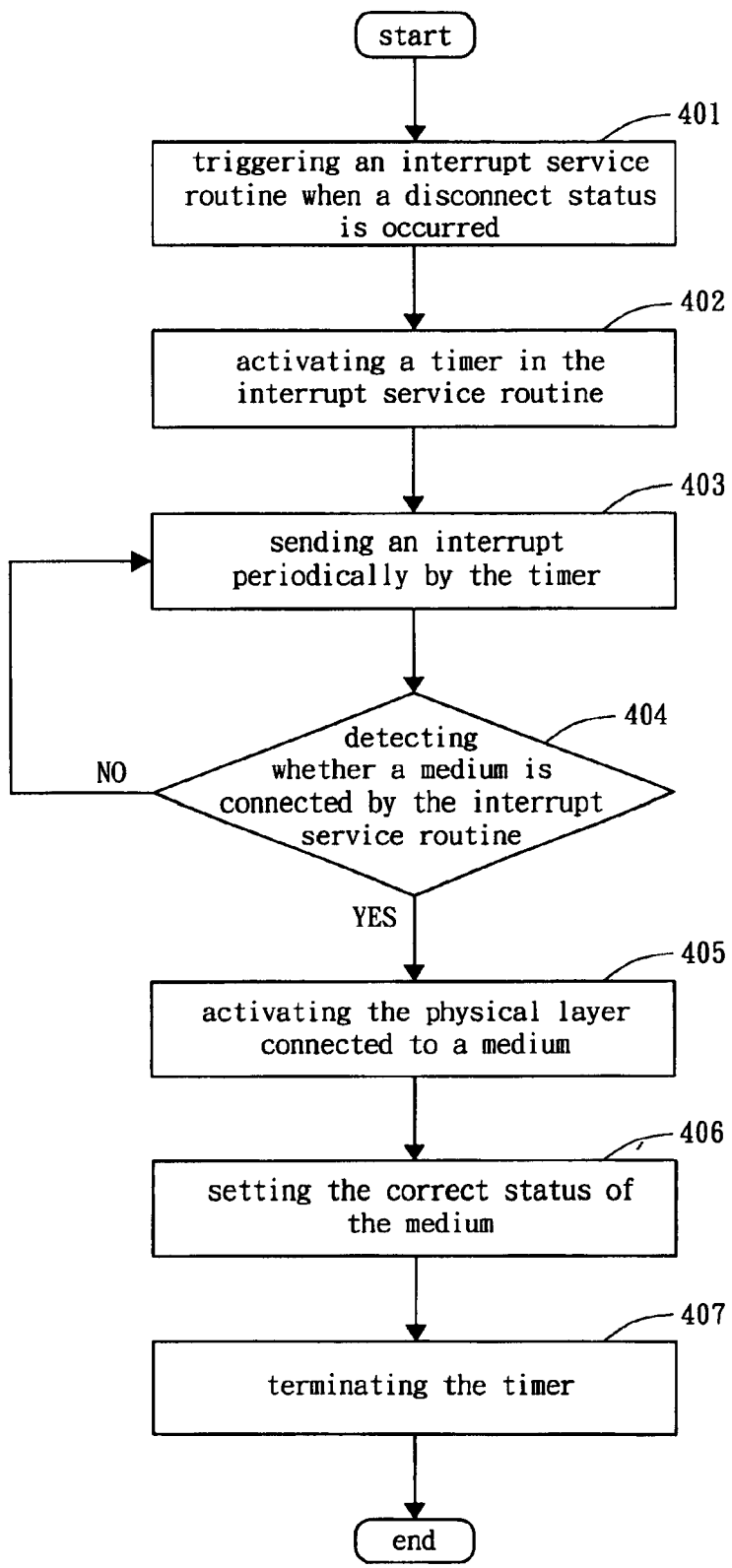
FIG. 4 is a flow chart for dynamically selecting a physical layer according to the preferred embodiment of the invention.

FIG. 4 is a flow chart of the method for dynamically selecting a physical layer according to the preferred embodiment of the invention. Referring to FIG. 4, in step 401, a disconnect status is achieved when the first medium is disconnected from the first connector. The first physical layer then sends an interrupt to the MAC layer. The MAC layer, upon receiving the interrupt from the first physical layer, also sends an interrupt to the driver. The driver, upon receipt of the interrupt from the MAC layer, triggers the interrupt service routine.

In step 402, the interrupt service routine activates the timer. The timer then periodically sends an interrupt to the driver in step 403 which thus activates the interrupt service routine.

In general, each physical layer comprises a plurality of registers for recording media status, such as a link status, an isolation status, a transmission speed (1 Mbps, 10 Mbps, 100 Mbps, or 1000 Mbps), and a full-duplex or half-duplex mode. For example, a link bit in the register is used for recording the link status, while an isolation bit in the register is used for recording the isolation status.

The interrupt service routine detects the link status of each physical layer in step 404 to determine whether a transmission medium is connected to the NIC. Namely, the interrupt service routine checks the link bit in the register of each physical layer. For example, if the link bit is "1", it represents the medium is connected to its corresponding physical layer; if the link bit is "0", it means the medium is not connected to its corresponding physical layer. After the interrupt service routine checks the link bit for each physical layer and when one medium is connected, step 405 is executed; otherwise repeat step 403, and the timer trigger an interrupt again to check the link bit of each physical layer for every predetermined period.

In step 405, the driver sets the physical layer which has been connected to a transmission medium to be active, and resets both the link status of the MAC layer and the activated physical layer. Meanwhile, the driver sets the isolation bit in the register of the physical layer to be "0". The isolation bit is used for indicating whether the physical layer and the corresponding medium are isolated. If the isolation bit is "0", the medium is connected to the physical layer and packets can be received or transmitted by the physical layer. On the other hand, if the isolation bit is "1", the medium is not connected to the physical layer and the packets cannot be received or transmitted by the physical layer. Under the condition in step 405, the physical layer is activated by setting the isolation bit to be "0".

In the step 406, the driver resets the correct status of the medium. The driver can read the transmission speed (such as 1 Mbps, 10 Mbps, 100 Mbps or 1000 Mbps) of the medium, and the transmission mode (such as the full-duplex or half-duplex mode) from the registers of the physical layer. Furthermore, the driver informs the operating system layer of the medium status such that all the related setup values can be done. The physical layer is therefore dynamically selected and normally connected to the network. The timer is then terminated in step 407.

According to the invention, the interrupt service routine is activated by the interrupts sent by the timer such that the driver can check and set each physical layer available on the NIC. However, the interrupt is not restricted to be generated by the timer; for example, a software interrupt may be generated by the driver. In addition, when the user plugs more than two media respectively to their connectors corresponding to the physical layers, the driver can select one of the physical layers for connecting to the network according to the priorities of the physical layers. A home local area network is used as an example for the preferred embodiment, but it does not restrict the field of application. The invention is applicable to any NIC having a number of physical layers, by which the physical layers can be selected dynamically. Furthermore, the timer present on the NIC can be used, therefore no additional timer is required to be installed on the NIC without increasing cost.

The method of the invention can dynamically select a physical layer without rebooting a computer. The computer system therefore can actively and dynamically check the physical layers and reset the status of the medium. Therefore, the use of the network system can become more convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically selecting one of a plurality of physical layers for a network interface card, the physical layers comprising at least a first physical layer and a second physical layer which are respectively connected to a first medium and a second medium, the method comprising steps of:

(a) triggering an interrupt service routine when the first medium disconnects from the first physical layer;

(b) activating a timer by the interrupt service routine in view of the first medium disconnecting from the first physical layer;

(c) sending an interrupt periodically by the timer to trigger the interrupt service routine until the interrupt service routine detects that the second medium is connected to the second physical layer, wherein the interrupt service routine checks a link status of each of the physical layers as the interrupt service routine is triggered;

(d) if the link status of the second physical layer indicates that the second medium is connected to the second physical layer, activating the second physical layer by setting link status of a media access control (MAC) layer and the second physical layer so as to link the MAC layer to the second physical layer;

(e) setting a correct status for the second medium by reading media status of the second physical layer including a transmission speed and a transmission mode of the second physical layer from registers of the second physical layer and by informing an operating system of the media status of the second physical layer; and (f) terminating the timer.

2. The method of claim 1, wherein the first medium is a telephone line with a transmission rate of 1 Mbps, and the second medium is an Ethernet twisted pair with a transmission rate of 10/100/1000 Mbps.

3. The method of claim 1, wherein, in step (c), the interrupt service routine determines whether the second medium is connected to the second physical layer by checking a link bit of the second physical layer.

4. The method of claim 1, wherein, in step (d), the second layer is activated by setting an isolation bit of the second physical layer.

5. The method of claim 1, wherein step (e) further comprises setting a transmission speed and a full-duplex or half-duplex mode.

6. A method for dynamically selecting one of a plurality of physical layers for a network interface card, the physical layers comprising at least a first physical layer and a second physical layer which are respectively connected to a first medium and a second medium, the method comprising steps of:

(a) when the first medium and the first physical layer are disconnected, in response to a periodically triggered interrupt signal, checking whether the second medium is connected to the second physical layer wherein if the second medium is connected to the second physical layer, then proceed to step (b);

(b) activating the second physical layer by setting the link status of a media access control (MAC) layer and the second physical layer so as to link the MAC layer to the second physical layer; and (c) setting a correct status for the second medium by reading media status of the second physical layer including a transmission speed and a transmission mode of the second physical layer from registers of the second physical layer and by informing an operating system of the media status of the second physical layer.

7. The method of claim 6, wherein the first medium is a telephone line with a transmission rate of 1 Mbps, and the second medium is an Ethernet twisted pair with a transmission rate of 10/100/1000 Mbps.

8. The method of claim 6, wherein, in step (a), an interrupt service routine is used to check a link bit of the second physical layer for determining whether the second medium is connected to the second physical layer.

9. The method of claim 6, wherein, in step (b), the second layer is activated by setting an isolation bit of the second physical layer.

10. The method of claim 6, wherein step (c) further comprises setting a transmission speed and a full-duplex or half-duplex mode.

* * * * *